July 4, 1961   P. CHAROS   2,990,978
MIXERS
Filed Oct. 15, 1959
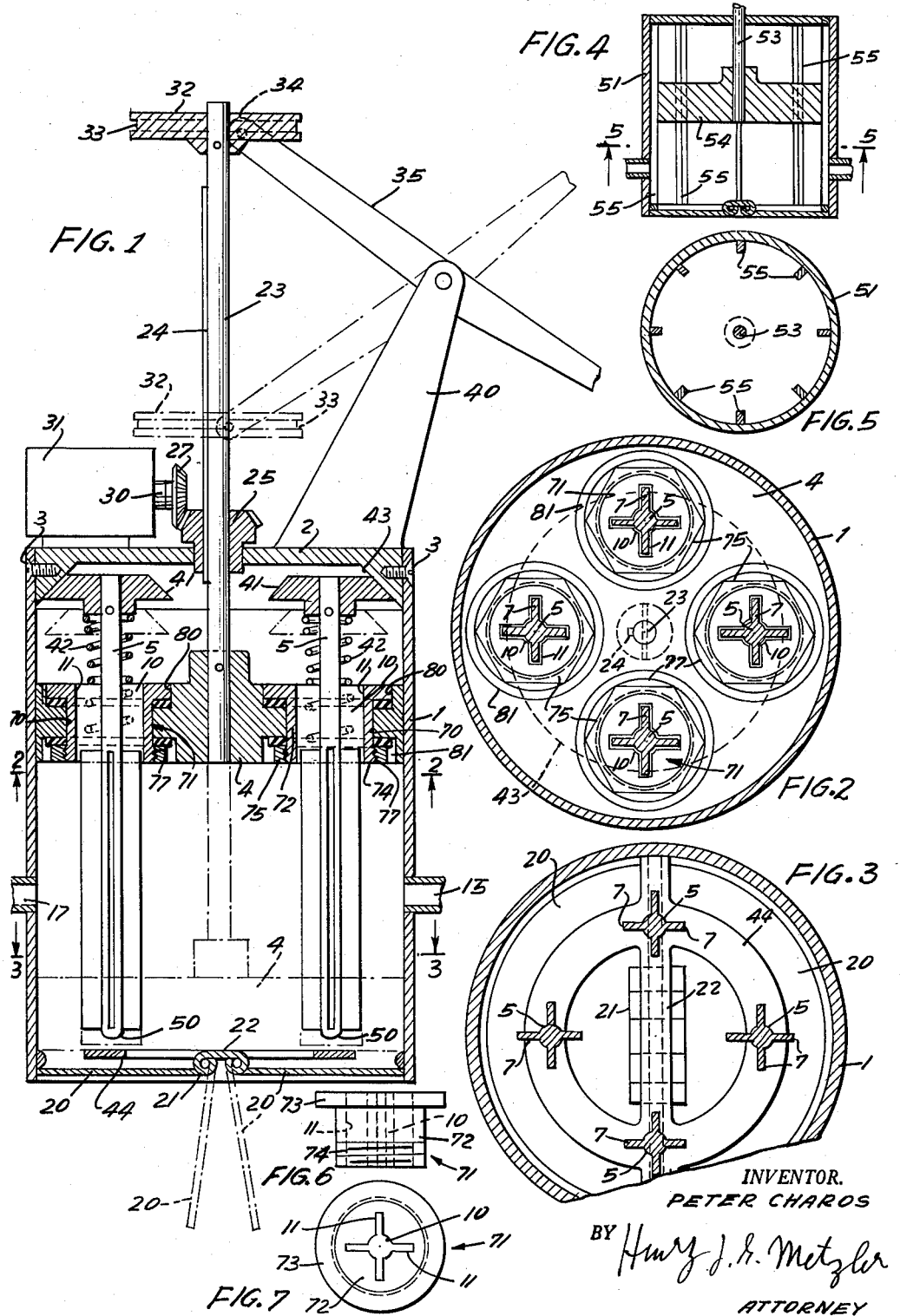
INVENTOR.
PETER CHAROS
BY Henry J. S. Metzler
ATTORNEY

United States Patent Office 2,990,978
Patented July 4, 1961

2,990,978
MIXERS
Peter Charos, P.O. Box 443, Hampton Bays, N.Y.
Filed Oct. 15, 1959, Ser. No. 846,711
4 Claims. (Cl. 222—235)

This patent application is a continuation-in-part application of my patent application Serial No. 736,167, filed May 19, 1958, now abandoned.

The present invention relates to improvements in mixing and stirring devices and, more specifically, it relates to a mechanical device, which I prefer to call an "Auto-Spinner Mix" and which is adapted for transforming certain milk products into semi-liquid substances such as are used in the preparation of pies, pastry items, and the like, although it can be used also for other purposes.

One object of the present invention is the provision of a device of the character described which carries out highly efficient mixing and stirring movements so as to make it possible to obtain a more thorough mixing in a shorter period of time than has been possible with any hitherto known device used for the same or similar purposes.

Another object of the present invention is the provision of a device of the character described which is compact, simple in construction, reliable in use, quick and easy to empty, easy to operate, and which is also sturdy, durable and well adapted for withstanding the rough usage to which devices of this type ordinarily are subjected.

A further object of the present invention is the provision of a device of the character described which allows rotating vertical blades to pass through a vertically moving piston which itself rotates in a direction opposite to the direction of rotation of the blades.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

In said drawing:

FIGURE 1 is a longitudinal sectional view of a preferred embodiment of my invention;

FIG. 2 is a sectional view on the line 2—2 of FIG. 1;

FIG. 3 is a sectional view on the line 3—3 of FIG. 1;

FIG. 4 is a longitudinal sectional view of a modification;

FIG. 5 is a sectional view on the line 5—5 of FIG. 4;

FIG. 6 is a detailed side view of a guide bushing which is rotatable in a piston; and, FIG. 7 is a detailed bottom plan view of the guide bushing of FIG. 6.

Similar reference characters refer to similar parts throughout the several views.

Referring first to FIGS. 1, 2 and 3, the numeral 1 denotes a cylinder having a cylinder head 2, which is secured to the upper portion of the cylinder 1 by means of screws 3 or the like. A piston 4 is constructed and arranged for rotating as well as for reciprocating in the cylinder 1. Spindles 5 are rotatably and slidably extended through the piston 4, and longitudinal fins or blades 7 are provided on the central and lower portions of each spindle 5. In the instance shown four fins 7 are provided on each one of the four spindles 5; however the number of fins 7 and spindles 5 can vary according to the specific purposes for which each mixer is designed. In order to allow a rotation of the spindles 5 with their fins 7 relatively to the piston 4, I prefer to provide the piston 4 with bores 70 in which guide bushings 71 are rotatably mounted that have holes 10 with radial grooves 11 for allowing the spindles 5 as well as the fins 7 to pass therethrough. While said guide bushings 71 may be of any suitable shape or form, I prefer to make each so that it has a cylindrical main portion 72 and an increased, outwardly flanged end portion 73, and is provided with an externally threaded section 74 at the lower end section of the main portion 72. A nut 75 is screwed upon each threaded portion 74, and packing rings or washers 77 preferably are interposed between the piston 4 and the elements 73 and 75, for preventing any of the semi-liquid substance in the device from penetrating through the piston 4. The bores 70 in the cylinder 4 have increased end portions 80 and 81, for accommodating the washers 77 as well as the bushing portion 73 and the nut 75. The portions 81 are especially large in diameter, in order to allow the use of a socket wrench or the like for the tightening of the nuts 75. Since the blades or fins 7 are always extended into, or through, the grooves 11, irrespective of whether the piston 4 is in its highest position as shown in full lines in FIG. 1, or in its lowest position as is indicated by dash-and-dotted lines in FIG. 1, the guide bushings 71 will rotate relatively to the piston 4, as long as the elements 5 and 7 are rotated. The ingredients to be mixed pass through pipes 15 and 17 into the cylinder 1, and the flow of the ingredients is controlled by means of valves (not shown) in said pipes. The bottom of the cylinder 1 is provided with any suitable closure means which allow a tight closing as well as an opening. In the instance shown said closure means consist of a pair of semi-circular plates 20 hinged at 21 to a narrow, thin blade 22, which has its ends secured to the cylinder 1.

When the cylinder 1 is full, the piston 4 is in the position shown in FIG. 1 in full lines. In this position the piston 4 is rotated in a clockwise direction, while the spindles 5 are being rotated in a counter-clockwise direction. After the ingredients have been thoroughly mixed, the aforementioned valves in the pipes 15 and 17 are closed, the rotation of the spindles 5 ceases, the plates 20 are moved from the position shown in FIG. 1 in full lines to the position shown in dash-and-dotted lines, so that the cylinder is open, and the piston 4 is being moved downwardly for the purpose of pushing the contents of the cylinder 1 completely out of the same. While the piston 4 moves downward to its position indicated by dash-and-dotted lines in FIG. 1, the fins 7 pass through the grooves 11, of the rotating guide bushings 71. Thereby the piston 4 may still be rotated, while the spindles 5 no longer rotate relative to the piston 4. The piston 4 stops its downward movement when it has reached the blade 22.

After the cylinder 1 has been emptied as described above, the plates 20 are moved back into their horizontal position, so as to close the bottom of the cylinder 1, the valves in the pipes 15 and 17 are opened, and the piston 4 is being moved upwardly. Thereby a new supply of ingredients is sucked into the cylinder 1.

The rotating movements of the parts 4 and 5 as well as the up-and-down movement of the part 4 can be carried out by any suitable means. For instance, a shaft 23 provided with a longitudinal key 24 is non-rotatably secured to the piston 4 and is slidably extended through a bevel gear wheel 25 which has a key way engaging the key 24, and which is rotatably mounted on the cylinder head 2. The wheel 25 is driven by another bevel gear wheel 27 secured to the shaft 30 of a motor 31. A disk 32, which has in its peripheral portion an annular groove 33, is secured to the upper end of the shaft 23, and a finger member 34 on a lever 35 engages the groove 33. The lever 35 is pivoted at 37 to a bracket 40, which is secured to the cylinder head 2. Thus by swinging of the lever 35 the parts 4, 23, 24 and 32 can be moved up and down. Any suitable roller members such as beveled friction wheels 41 are secured to the upper ends of the spindles 5, and springs 42 preferably are interposed between the wheels 41 and the piston 4. The cylinder head 2 is provided with a taper flange portion 43, adapted for engaging the roller members or bevel friction wheels 41. A circular rim portion 44 is provided on the blade 22.

If the piston 4 is in the position shown in full lines in FIG. 1, the springs 42 force the bevel friction wheels 41 against the flange portion 43, so that the clockwise rotation of the piston 4 causes a counter-clockwise rotation of the spindles 5. Thereby the lower extremities 50 (FIG. 1) of the spindles 5 do not touch the ring portion 44. When the piston 4 begins to move downwardly the spindles and the roller members or friction wheels 41—after expansion of the springs 42—move also downwardly but only so far that the wheels 41 no longer are in frictional engagement with the flange portion 43, so that the spindles 5 cease to rotate. Thereby the extremities 50 of the spindles 5 rest upon the ring portion 44, so that the rotation of the piston 4 can continue. If it is desired to have the parts 5 and 7 rotate relative to the piston 4 even if the piston 4 is down, close to, or adjacent, the element 44, all that is necessary to do is to make the springs 42 longer, so that they continue to press the wheels 41 against the flange portion 43. Thus, just by the insertion of springs 42 of different dimensions, the cessation of a rotation of the elements 5, 7 and 41 relative to the piston 4 can be brought about or altered according to the position of the piston 4. While I have found the above described arrangement of grooved guide bushings 71 most practical and economical, I am aware that the same can be omitted, and instead the piston 4 itself can be provided with vertical bores and grooves through which the elements 5 and 7 pass, and in this case any suitable electrical or hydraulic, or pneumatic timing devices or special gear arrangements could be employed for causing a rotation of the elements 5 and 7 relative to the piston 4 only as long as the piston 4 is above the fins 7, and for alignment of the fins 7 with said grooves in the piston 4 when the same approaches the fins 7. In this case only the lower portion of each spindle 5 would be provided with fins 7.

According to the modification of FIGS. 4 and 5, a piston 54 rotates in a cylinder 51 and can also be moved up and down by means of a shaft 53. Here, instead of the parts 5, 7, 41 and 42, a plurality of vertical blades 55 pass through upright grooves in the peripheral portion of the piston 54, so as to scrape the inner side of the wall of the cylinder 51 while the piston 54 is rotating and reciprocating. The other elements may be the same as those of FIGS. 1, 2 and 3.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A mixer comprising a receptacle open at its bottom, a closure means provided on the bottom of said receptacle, a piston rotatably and reciprocably mounted in said receptacle, a wheel rotatably mounted on said receptacle, a shaft secured to said piston extending beyond said receptacle and through said wheel, means for rotating said wheel being connected thereto, means for reciprocating said shaft being mounted outside of said receptacle, blades parallel to the axis of rotation of said piston mounted in said receptacle and slidably extended through said piston, and means mounting said blades so that they rotate with said piston, comprising roller members connected to said blades and in frictional engagement with stationary portions of said receptacle for rotating said blades relative to the piston, said blades being longer than the stroke of the piston, so as to always extend through the piston in every position of the same.

2. A device of the character described comprising a vertical cylinder open at its bottom, a closure means provided on the bottom of said cylinder, a piston provided with perforations rotatably and reciprocatably mounted in said cylinder, blades parallel to the axis of rotation of said piston mounted in said cylinder and shiftably as well as rotatably extended through the perforations in said piston, a wheel rotatably mounted on said receptacle, a shaft secured to said piston extending beyond said receptacle and through said wheel, means for rotating said wheel being connected thereto, means for reciprocating said shaft being mounted on said receptacle, and means mounting said blades so that they rotate with said piston, comprising roller members connected to said blades and in frictional engagement with stationary portions of said receptacle for rotating said blades in a direction opposite to the direction of rotation of said piston, said blades being longer than the stroke of said piston, so as to always extended through the piston in every position of the same.

3. A mixer comprising a cylinder having an open bottom portion, closure means mounted on the bottom portion of said cylinder, a piston provided with perforations rotatably and reciprocatably mounted in said cylinder, blades parallel to the axis of rotation of said piston mounted in said cylinder and extended through said perforations, guide bushings through which said blades are slidable being rotatably extended through the perforations in said piston and interposed between said blades and said piston, a wheel rotatably mounted on said receptacle, a shaft secured to said piston extending beyond said receptacle, means for rotating said wheel being connected thereto, means for reciprocating said shaft being mounted on said receptacle, and means mounting said blades so that they rotate with said piston, comprising roller members connected to said blades and being in frictional engagement with stationary portions of said receptacle, said blades being longer than the stroke of the piston, so as to always extend through the piston in every position of the same.

4. A device of the character described comprising a vertical cylinder having an open bottom portion and a closed upper portion, closure means mounted on the bottom portion of said cylinder, a piston provided with perforations rotatably and vertically reciprocatably mounted in said cylinder, a guide bushing rotatably mounted in each perforation of said cylinder and having an axial bore and grooves radiating therefrom, vertical spindles slidably extending through the bores in said guide bushings, longitudinal blades radially extended from said spindles being slidably extended through the grooves in said guide bushings, a wheel rotatably mounted on said cylinder, a shaft secured to said piston extending beyond said cylinder and through said wheel, means for rotating said wheel being connected thereto, means for reciprocating said shaft being mounted on said cylinder, and means mounting said blades so that they rotate with said piston, comprising roller members connected to said spindles being in frictional engagement with stationary portions of said cylinder, said blades being longer than the stroke of the piston so as to permanently extend through said guide bushings in said piston irrespective of the position of the piston.

References Cited in the file of this patent
UNITED STATES PATENTS

| | | |
|---|---|---|
| 2,831,606 | Alters | Apr. 22, 1958 |
| 2,859,017 | Frumbull et al. | Nov. 4, 1958 |
| 2,895,648 | Woughter | July 21, 1959 |